United States Patent [19]

Leitgeb et al.

[11] Patent Number: 4,516,912
[45] Date of Patent: May 14, 1985

[54] COMPRESSOR ARRANGEMENT FOR A HEAT PUMP INSTALLATION

[75] Inventors: Wilhelm Leitgeb; Siegfried Schönwald, both of Bad Neustadt, Fed. Rep. of Germany

[73] Assignee: Siemens Aktiengesellschaft, Berlin and Munich, Fed. Rep. of Germany

[21] Appl. No.: 476,428

[22] Filed: Mar. 17, 1983

[30] Foreign Application Priority Data

Apr. 28, 1982 [DE] Fed. Rep. of Germany ....... 3215814

[51] Int. Cl.³ .......................................... F04B 49/06
[52] U.S. Cl. ..................... 417/45; 318/313; 318/640; 417/902
[58] Field of Search ............. 417/410, 415, 354, 366, 417/902, 271; 363/86, 131, 132, 124; 318/640, 313, 480; 310/67

[56] References Cited

U.S. PATENT DOCUMENTS

| 3,924,167 | 12/1975 | Clark et al. | 318/313 X |
| 3,997,823 | 12/1976 | Machida | 318/254 X |
| 4,047,081 | 9/1977 | Liska | 363/132 X |
| 4,050,006 | 9/1977 | Stich | 363/132 X |
| 4,099,225 | 7/1978 | Nygaard | 363/132 X |
| 4,217,508 | 8/1980 | Uzuka | 310/46 |
| 4,249,116 | 2/1981 | Hieda | 318/254 |
| 4,352,642 | 10/1982 | Murayama et al. | 417/902 X |

FOREIGN PATENT DOCUMENTS 2832017 1/1980 Fed. Rep. of Germany ...... 417/271

Primary Examiner—Edward K. Look
Attorney, Agent, or Firm—Kenyon & Kenyon

[57] ABSTRACT

A compressor arrangement for a heat pump installation in which an electric motor is provided as the drive means for the compressor is disclosed. In order to make possible operation of the compressor without unpermissibly large surge currents in the electric network supplying power to the electric motor, the compressor is driven by a permanent magnet-excited d-c motor which is provided with an electronic commutating device. The starting current drawn by the d-c motor can be controlled by means of a d-c voltage control element coupled to the electric network by a rectifier so as to prevent unpermissibly large starting surge currents.

1 Claim, 2 Drawing Figures

COMPRESSOR ARRANGEMENT FOR A HEAT PUMP INSTALLATION

BACKGROUND OF THE INVENTION

The present invention relates to a compressor arrangement for a heat pump installation in which an electric motor is provided as the drive means for the compressor.

In such commercially available compressor arrangements, asynchronous three-phase motors are provided as the drive means. The drive power of such compressor arrangements for heat pump installations for the heating of single and multi-family houses is in the range of about 2 to 6 kW. With this order of power, surge currents are obtained which are about 30 A and more. In weak networks, brief voltage drops can occur due to such surge currents of a magnitude which are not permissible, for instance, especially if electronic equipment or lighting devices are coupled to the network. In order to keep such disturbances small, regulations often permit only a given number of switching actions, for instance, three switching actions per hour. This greatly limits the operation of the heat pump installation. Other attempts have been made in the past to reduce such surge currents by supplemental means, for instance, by lowering the voltage at the motor and at the same time relieving the pressure of the compressor. However, these measures are expensive and their effect is unsatisfactory.

Accordingly, it is an object of the present invention to develop a compressor arrangement of the type described above such that surge currents can be limited to low values without any supplemental measures.

SUMMARY OF THE INVENTION

This and other objects of the present invention are achieved by providing a compressor arrangement in which the compressor is driven by a d-c motor which is excited by a permanent magnet field. An electronic commutating device controlled by means of a d-c control element fed from the electrical network via a rectifier controls the d-c motor. Surge currents can thereby be limited by the d-c control element in a relatively simple manner. Using this arrangement, it is possible to limit the surge currents to the magnitude of the operating current.

The compressor power can be controlled in a relatively simple manner by utilizing a radial piston type compressor. Such a compressor has no valves and can therefore be operated over a large range of speeds. Variation in speed can be achieved because of the use of a d-c motor and expensive control equipment is not necessary.

In a preferred embodiment, an external-rotor motor is used. Driving the radial piston compressor with an external-rotor motor has the advantage that the external rotor of the d-c motor can be designed as a cup-shaped housing and the permanent magnets can be arranged along the inside wall of the housing, since the centrifugal forces are directly taken up by the wall of the housing.

All components of the compressor arrangement can be built into a hermetically sealed capsule. Cooling the components with the compressor's own refrigerant makes it possible to utilize the heat loss of the individual components in the heat pump installation.

BRIEF DESCRIPTION OF THE DRAWINGS

The invention will be described in greater detail in the following detailed description with reference to the drawings in which.

DETAILED DESCRIPTION

Figure 1:
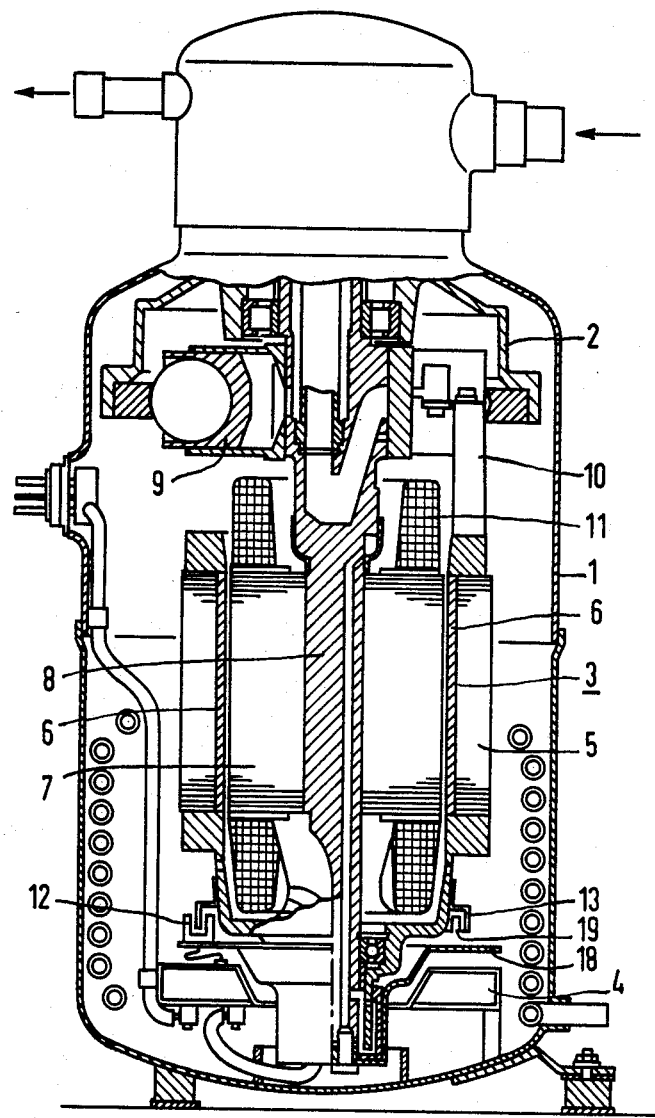
FIG. 1 is a cut-away side view of a compressor arrangement in which the compressor is coupled to a permanent magnet-excited d-c motor.

With reference now to the drawings, reference numeral 1 designates a hermetically sealed capsule in which a radial piston compressor 2 and a permanent magnet-excited d-c motor 3 including an electronic commutating device 4 are disposed. The d-c motor 3 is designed as an external-rotor motor. The external rotor 5 comprises a cup-shaped housing, along the inside wall of which permanent magnets 6 are fastened. The internal stator 7 is arranged on a stationary shaft 8. On this shaft 8 is also rotatably supported the cylinder block 9 of the radial piston compressor 2. The cylinder block 9 is coupled to the external rotor 5 and is driven by the latter via arms 10 provided on the external rotor 5.

Figure 2:
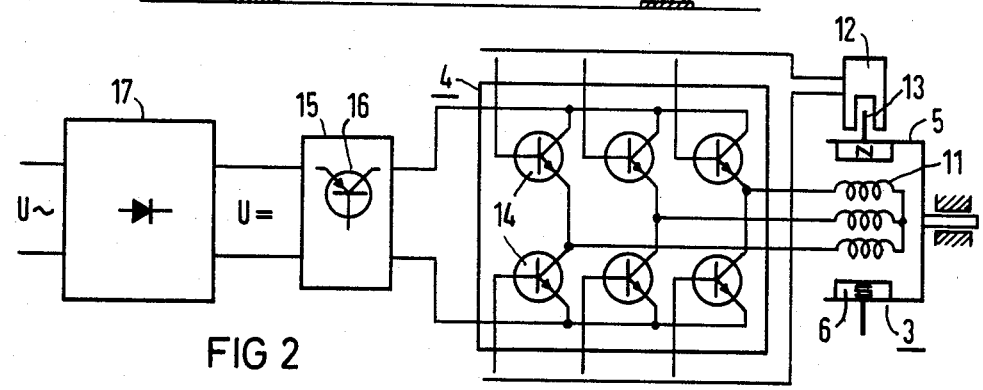
FIG. 2 is a simplified circuit diagram of the d-c motor drive.

The determination of the rotor position necessary for controlling the field of the stator winding 11 is accomplished by means of a transmitter which may comprise, for instance, a rotating apertured ring 13 which is fastened to the external rotor 5 and rotates between the two legs of a U-shaped holder 12. On the one leg of the U-shaped holder 12 may be arranged, for instance, a light source and on the other leg, a light-sensitive receiver, for instance, a photo resistor. The apertured ring 13 has a number of slits 19 which are related to the number of rotor poles, and the position of which on the circumference of the ring 13 is related to the position of the rotor poles. In this manner, signals depending on the rotor position are generated at the light-sensitive receiver. These signals control the semiconductor switching elements 14 provided in the commutating device, as indicated in FIG. 2. Alternatively, other means, such as magnetic field-sensitive elements may also be used for the rotor position transmitter and receiver.

The commutating device 4 is preceded by a d-c voltage control element 15, the control element of which, for instance, a transistor 16, is controlled in dependence on the current drawn. The d-c voltage control element 15 is connected to the d-c output of a rectifier 17 and receives from the latter a d-c voltage $U_=$. The rectifier 17 input is connected to the a-c line voltage $U_\sim$.

Due to the current-dependent control of the d-c control element 15, the starting current of the d-c motor 3 can be adjusted so that no unpermissible values occur on the a-c voltage side of the rectifier 17. Because a permanent magnet-excited d-c machine is used, higher efficiency is obtained than with an installation operated with an asynchronous a-c motor because of the smaller losses of the d-c machine, although the operation is the same.

In the embodiment shown in FIG. 1, the commutating device 4 is arranged physically separated by a support plate 18 which is fastened to the shaft 8 and contains the U-shaped holder 12. The vibrations of the compressor are thereby isolated from the commutating device 4 by this separate arrangement. If a vibration-insulated arrangement of the commutating device 4 is necessary, the latter can likewise be arranged on the support plate 18.

In the diagram shown in FIG. 2, a separate voltage control element 15 is provided. The function of such a voltage controller can also be performed by the switching elements 14 of the commutating device 4 if they are controlled accordingly.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. In a compressor arrangement for a heat pump installation in which an electric motor is provided as the drive means for the compressor, the improvement comprising:

said electric motor comprising a permanent magnet-excited d-c motor having a stator winding and a rotor;

electronic commutating means for controlling said d-c motor so as to provide said stator winding with electrical current of the proper polarity at selected times in dependence on the position of said rotor;

d-c voltage control means coupled to said commutating means for controlling the starting current of said d-c motor so as to maintain said starting current within permissible limits, said d-c voltage control means including means for controlling the speed of said d-c motor; and rectifier means coupling said d-c voltage control means to an a-c electric network for powering said motor;

said compressor comprising a radial piston compressor.

* * * * *